June 25, 1957  J. J. MAUGET  2,796,701
TOOL FOR PLACING FEEDING TUBES IN PLANT STEMS
Filed March 30, 1954

JAMES J. MAUGET,
INVENTOR.

BY *Knight & Rodgers*
ATTORNEYS.

United States Patent Office 2,796,701
Patented June 25, 1957

2,796,701

TOOL FOR PLACING FEEDING TUBES IN PLANT STEMS

James J. Mauget, Los Angeles, Calif., assignor to Mauget Company, Los Angeles, Calif., a partnership Application March 30, 1954, Serial No. 419,749

5 Claims. (Cl. 47—57.5)

The present invention relates generally to devices for introducing a liquid into the stem of a plant, and more especially to a tool for thrusting into the plant stem a hollow feeding tube through which the liquids are introduced into the plant.

In my co-pending application Ser. No. 364,640, filed June 29, 1953, and titled "Supplementary Feeder for Plants" (now abandoned), I disclose a device of this character which includes a short metal tube that is adapted to be thrust into the stem of a plant and left for as long a time as required. To the outer end of this tube there is attached a reservoir, which may be large or small, or any other suitable source of liquid to be introduced into the plant.

For several reasons, these feeding tubes are preferably made of aluminum or an aluminum alloy. Tubes of this character are comparatively inert with respect to the solutions handled and do not corrode in use or with the passage of time from weathering. Also, these tubes are inexpensive and easily made. However, they suffer from the disadvantage that, although of metal, they are relatively soft and therefore buckle or bend easily when blows are applied to their outer end to drive them into the stem of a plant. This is particularly true when a tube is set into a relatively hard or dense material, as for example the trunk of a tree. For reasons of economy as well as to keep the maximum size of hole formed as small as possible, the tubes are relatively thin walled. This provides the maximum size of liquid passage for a given external diameter of the tube.

Hence it becomes a general object of my invention to provide a tool for thrusting a feeding tube into the stem of a plant while supporting the tube internally in order to keep the tube straight.

It is also an object of my invention to provide a tool for thrusting feeding tubes into the stems of plants which makes it possible to perform this operation in a minimum length of time because the tool is such that the tube can be driven home and then the tool quickly withdrawn to permit use of it on the next plant stem.

It is also an object of my invention to provide a tool of this character which limits the depth of penetration of the tube, not only so that all tubes may be set at the optimum depth in plants of a given size but to prevent unnecessary damage to plant stems which may be comparatively fragile and to reduce to a minimum the time required to set each given tube.

In a preferred form of my invention, these objects are attained by providing a mandrel which is sharpened at one end and which fits with a loose sliding fit into the feeding tube to be inserted in a given plant. An adjustable lock member is mounted on the mandrel, preferably by a conventional threaded connection so that as the stop is rotated it is also moved axially of the mandrel. The stop member is outside the tube where it engages the outer surface of the stem to limit the penetration of the tube and mandrel. The outer end of the mandrel is preferably provided with a head or the like for receiving blows or force applied manually to drive the tube and mandrel into the plant stem.

In a preferred embodiment, a lock nut is mounted on the mandrel to engage the stop member and hold it in any adjusted position. This simplifies the problem of setting accurately a number of tubes all to the same depth. In a simplified form, this lock nut may be omitted.

The term "stem" is used herein in its broad sense to include the main stem or axis of any plant, bush, shrub, or tree, regardless of size or any branch thereof.

How the above objects and advantages of my invention are attained as well as other objects and advantages not specifically mentioned herein, will be better understood from the following description and by reference to the annexed drawings, in which.

Figure 1:
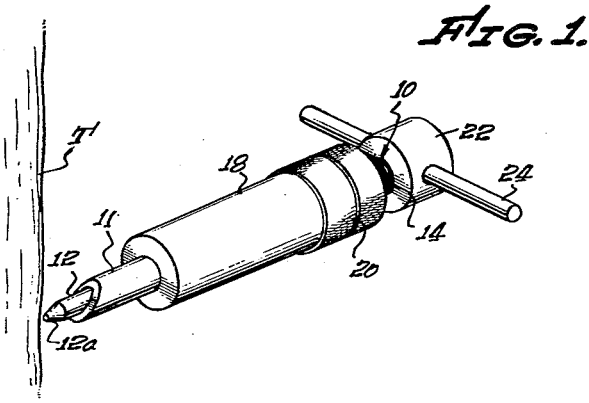
Fig. 1 is a perspective view of a preferred embodiment of my invention as it appears when in position to thrust a feeding tube into the trunk of a tree.
Figure 2:
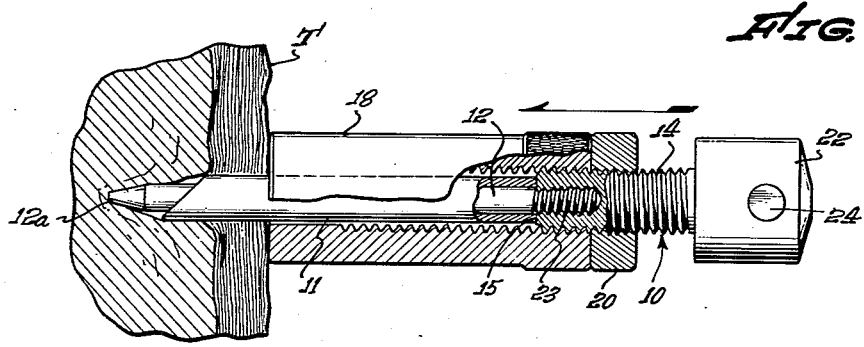
Fig. 2 is an enlarged vertical section of a preferred form of my invention showing the tube and tool as they appear when the tube has been thrust into the tree trunk to the maximum depth desired.
Figure 3:
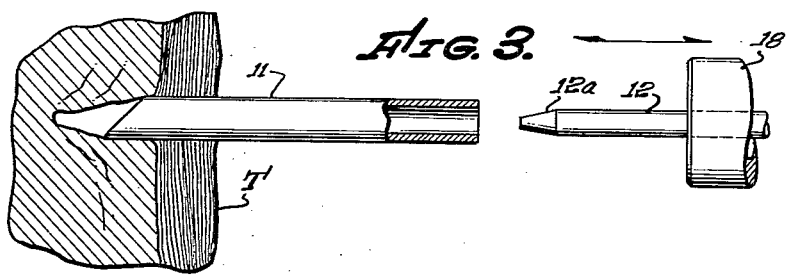
Fig. 3 is similar to Fig. 2 showing the tool being withdrawn from the tube, the tube being left in place in the plant stem.

Referring now to the drawings, there is shown in Figs. 1, 2, and 3 a preferred embodiment of my invention which is adapted to thrust a feeding tube into a relatively hard or resistant material, as for example a trunk T of a tree. There is indicated generally at 10 a mandrel upon which is mounted feeding tube 11 in order that the feeding tube may be thrust into the trunk. Mandrel 10 comprises a forward section 12 of relatively reduced diameter which is sharpened at its forward end. It preferably has a conical point 12a. It is upon this forward portion of the mandrel that the tube 11 is mounted, the mandrel section 12 being slightly less in diameter than the internal diameter of tube 11 so that the mandrel acts as a solid core within the tube to stiffen it and prevent it from bending or buckling under endwise thrust applied to the tube during the setting operation.

Mandrel 10 also comprises a rearward section 14 of relatively larger diameter than section 12. At the forward end of mandrel section 14 is a forwardly facing driving shoulder 15 which engages the rear end of tube 11 to apply endwise force to the tube to thrust it into the plant stem. The length of section 12 is such that the point 12a of the mandrel projects beyond tube 11 when the tube is against shoulder 15. Rearward section 14 of the mandrel is externally threaded, for at least part of its length, as shown particularly in Fig. 2.

Stop member 18 is mounted upon the mandrel, the stop having an internal thread adapted to engage the external thread on mandrel section 14 to connect the stop to the mandrel. Because of the threaded connection of these two members, as the stop member is rotated, it is also moved axially of the mandrel. Stop 18 is a tubular member the internal bore of which is sufficiently large that the stop passes over the outside of feeding tube 11 and extends forwardly over the tube, as shown in Figs. 1 and 2. Since stop 18 is outside of and larger in diameter than tube 11, it engages the outside of the tree trunk and thereby limits the penetration of the mandrel and tube into the trunk. The depth of penetration of the mandrel and feeding tube is limited by position of stop 18; and this position may be varied as desired by rotating the stop which changes the distance between the front end of the stop and the forward end of the mandrel.

In order to hold the mandrel in any adjusted position, lock nut 20 is provided. It is threadedly connected to the mandrel by the external threads on mandrel 14 and abuts the rear end of stop 18. By tightening stop 18 and lock nut 20 together, the stop is held against rotation in any position of adjustment.

Because a trunk of a tree ordinarily offers considerable resistance to being pierced by a feeding tube, it is usually necessary to drive the mandrel and tube into the trunk by applying hammer blows to the outer end of the mandrel. For this purpose it is desirable to provide a head 22 on the outer end of mandrel 10 to receive these hammer blows. Head 22 may be of any convenient shape and is ordinarily larger than the threaded portion of the mandrel in order to provide an extended area for receiving blows or any other force applied to the mandrel to cause the tube to penetrate the tree trunk.

Although mandrel 10 may be made in a single piece, I prefer to make the two sections 12 and 14 separately and unite them by a threaded connection indicated at 23. The threaded connection at 23 is preferably a left hand thread which is of the opposite hand to the external thread on mandrel section 14, which is a conventional right hand thread. After the mandrel and tube are driven into a dense material, such as the tree trunk, it is sometimes rather difficult to merely pull the mandrel out, and extraction is facilitated by turning the mandrel to loosen it in the trunk and then continuing to twist it as it is withdrawn. The natural tendency is to turn the mandrel in the direction to unscrew a right hand thread and for this reason the internal thread at 23 is made a left hand thread so that it is tightened rather than loosened by this twisting movement of the mandrel. In order to provide a better grip on the outer end of the mandrel for such turning, the mandrel is provided with a cross bar or pin 24 which provides a handle by which the mandrel may be gripped.

In operation, a feeding tube 11 is slipped over the forward end of the mandrel and the rear end of the tube is brought into engagement with shoulder 15 on the mandrel. For each different size of tube 11 there is a corresponding mandrel since it is desirable that the forward reduced diameter portion 12 of the mandrel substantially fill the interior of the tube in order to provide a core that affords maximum support to the tube against bending under force applied axially to the tube. Stop member 18 is then adjusted to the desired position and the pointed forward end 12a of the mandrel is placed against the plant stem, in this case trunk T of the tree. The mandrel and tube are then driven into the tree trunk by force applied to the outer end of the mandrel in any suitable manner, as by hitting head 22 several light blows with a hammer. The mandrel and tube are driven into the tree, starting with position of the parts as in Fig. 1, until the front end of stop 18 is against the exterior surface of the tree, as shown in Fig. 2.

Where the stem of the plant does not grip the mandrel too firmly, the mandrel can be removed by simply pulling outwardly on it. If resistance is too great for this, the mandrel may be more easily loosened by rotating it and simultaneously pulling outwardly on it. The combined movements cause it to release itself quickly from the tree and the mandrel can then be withdrawn, as shown in Fig. 3, leaving the feeding tube in place in the trunk.

Figure 4:
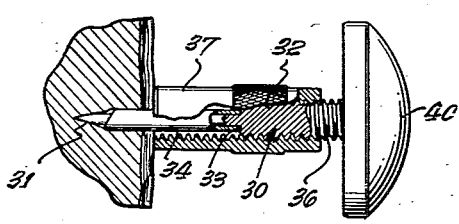
Fig. 4 is a combined vertical section and side elevation of a simplified form of my invention.

When it is desired to insert a feeding tube into the stem of bushes or small plants, a tube of smaller diameter is desired in order to keep from splitting the stem. In this case the stem offers less resistance to insertion of the tube, so that the driving tool can be made smaller and lighter. This is especially true in very small sizes when the tube may be thrust into the stem easily by a steady pressure applied to the end of the mandrel by the thumb, no blows being required. An example of a smaller size of tube and driving tool is shown in Fig. 4, this being a simplified form of my invention.

In the simplified form, mandrel 30 is made in one piece. The forward section 31 of reduced diameter is sharpened to a point at one end and is integrally connected at the other end to rearward section 32 which is of larger diameter than the forward section. At the junction of the two sections, there is formed a forwardly facing shoulder 33 which engages the rear end of feeding tube 34 as the tube is driven into the plant.

The mandrel has an external thread 36 on the section of larger diameter as a means for mounting on the mandrel cylindrical stop member 37. The stop is provided with an internal thread which engages external thread 36 to permit adjustment of the stop axially of the mandrel. In this simplified form, the lock member is omitted and reliance may be placed upon a relatively tight fit between the threaded portions of the mandrel and stop member to hold the stop member in any adjusted position.

At the outer end of mandrel 30 is located head 40 which is preferably provided with a smoothly rounded exterior surface against which the thumb of the operator may press with comfort to push the mandrel and tube into the plant stem. For many applications, the force which may be applied to head 40 by the thumb is quite sufficient. Head 40 may be attached to mandrel 30 in any suitable way, as by a threaded connection or by being formed integrally therewith. Except as particularly noted, the construction and operation of this simplified form of driving tool is the same as described above in connection with the preferred embodiment of my invention.

From the foregoing description it will be apparent that various changes may be made within the spirit and scope of my invention in the shape and arrangement of the parts of my improved form of driving tool. Accordingly, it is to be understood that the foregoing description is considered as being illustrative of, rather than limitative upon, the appended claims.

I claim:

1. A tool for thrusting a feeding tube into the stem of a plant, comprising: a mandrel adapted to slide easily into the feeding tube and to support the tube against bending, said mandrel having a shoulder spaced from the forward end of the mandrel by a distance slightly in excess of the length of the tube; and a stop member adjustably mounted on the mandrel to limit the penetration of the mandrel into the plant stem, said stop being mounted on the mandrel beyond the shoulder and extending forwardly toward the end but outside of the feeding tube.

2. A tool for setting a feeding tube into the stem of a plant, comprising: a mandrel having a forward section of relatively reduced diameter and an externally threaded rearward section of relatively larger diameter providing a forwardly facing shoulder; and a cylindrical stop threadedly connected to said threaded section of the mandrel to move longitudinally thereof upon rotation; said stop being annularly spaced from the reduced diameter section of the mandrel to receive the feeding tube between the mandrel and the stop.

3. A tool as in claim 2 that is provided with a blow-receiving head on the mandrel at the outer end of the threaded section and spaced from the shoulder; and means on the head for rotating the mandrel to free it from the stem of the plant.

4. A tool as in claim 2 that also includes a lock nut mounted on the threaded section of the mandrel to engage the stop and hold it against rotation when in an adjusted position.

5. A tool as in claim 2 in which the two sections of the mandrel are separable and are connected by a threaded connection of opposite hand than the external thread on the section of larger diameter.

References Cited in the file of this patent

UNITED STATES PATENTS 569,896    Van Cauwenberg    Oct. 20, 1896

(Other references on following page)

UNITED STATES PATENTS

| | | | |
|---|---|---|---|
| 722,559 | Bond | Mar. 10, | 1903 |
| 2,437,134 | Smith | Mar. 2, | 1948 |

FOREIGN PATENTS

| | | | |
|---|---|---|---|
| 509,672 | France | Aug. 23, | 1920 |
| 177,426 | Great Britain | Mar. 30, | 1922 |

OTHER REFERENCES

"Plant Injection for Diagnostic and Curative Purposes," (Roach). Published by the Imperial Bureau of Horticulture and Plantation Crops (East Malling, Kent, England), October 1938, as Technical Communication No. 10. Pages 41, 44, 45, 46.